United States Patent
Ito

(10) Patent No.: US 8,410,920 B2
(45) Date of Patent: Apr. 2, 2013

(54) PROXIMITY NOTIFICATION DEVICE, PROXIMITY NOTIFICATION PROGRAM AND METHOD FOR NOTIFYING PROXIMITY OF VEHICLE

(75) Inventor: Yosuke Ito, Okazaki (JP)

(73) Assignee: Denso Corporation, Kariya (JP)

( * ) Notice: Subject to any disclaimer, the term of this patent is extended or adjusted under 35 U.S.C. 154(b) by 394 days.

(21) Appl. No.: 12/927,309

(22) Filed: Nov. 10, 2010

(65) Prior Publication Data

US 2011/0133915 A1 Jun. 9, 2011

(30) Foreign Application Priority Data

Dec. 4, 2009 (JP) .................................. 2009-276680

(51) Int. Cl.
*B60Q 1/00* (2006.01)
(52) U.S. Cl. ......................... 340/435; 340/436; 701/301
(58) Field of Classification Search .................. 340/435, 340/436, 901; 701/300, 301
See application file for complete search history.

(56) References Cited

U.S. PATENT DOCUMENTS

| 7,792,641 | B2 * | 9/2010 | Liu et al. ........................ | 701/301 |
| 7,881,868 | B2 * | 2/2011 | Greene et al. ................. | 701/301 |
| 2005/0200462 | A1 | 9/2005 | Maekawa et al. | |
| 2011/0210866 | A1 * | 9/2011 | David et al. .................... | 340/901 |
| 2011/0246156 | A1 * | 10/2011 | Zecha et al. ...................... | 703/6 |

FOREIGN PATENT DOCUMENTS

| JP | 2002-2424 | 1/2002 |
| JP | 2003-320912 | 11/2003 |
| JP | 2005-253236 | 9/2005 |
| JP | 2005-255091 | 9/2005 |
| JP | 2008-021269 | 1/2008 |
| JP | 2008-062666 | 3/2008 |
| JP | 2008-282097 | 11/2008 |
| JP | 2009-8394 | 1/2009 |
| JP | 2009-67382 | 4/2009 |
| JP | 2009-81991 | 4/2009 |

OTHER PUBLICATIONS

Office action dated Nov. 8, 2011 in corresponding Japanese Application No. 2009-276680.

* cited by examiner

*Primary Examiner* — John A Tweel, Jr.
(74) *Attorney, Agent, or Firm* — Harness, Dickey & Pierce, PLC

(57) ABSTRACT

A probability acquisition unit reads a collision probability that a pedestrian collides against a self-vehicle, from a data map, in which positions of a pedestrian are beforehand associated with collision probabilities, with reference to an obtained position of a pedestrian around a self-vehicle. A function control unit activates an alarm unit to cause an alarm to notify proximity of the self-vehicle to a pedestrian when the obtained collision probability is higher than a threshold. An obstacle acquisition unit obtains a detection result of an obstacle, which obstructs movement of a pedestrian. A path estimation unit estimates a traveling path of the self-vehicle on the data map. The probability acquisition unit decreases a collision probability in a region of the data map, the region being beyond the detected obstacle when viewed from the traveling path.

8 Claims, 8 Drawing Sheets

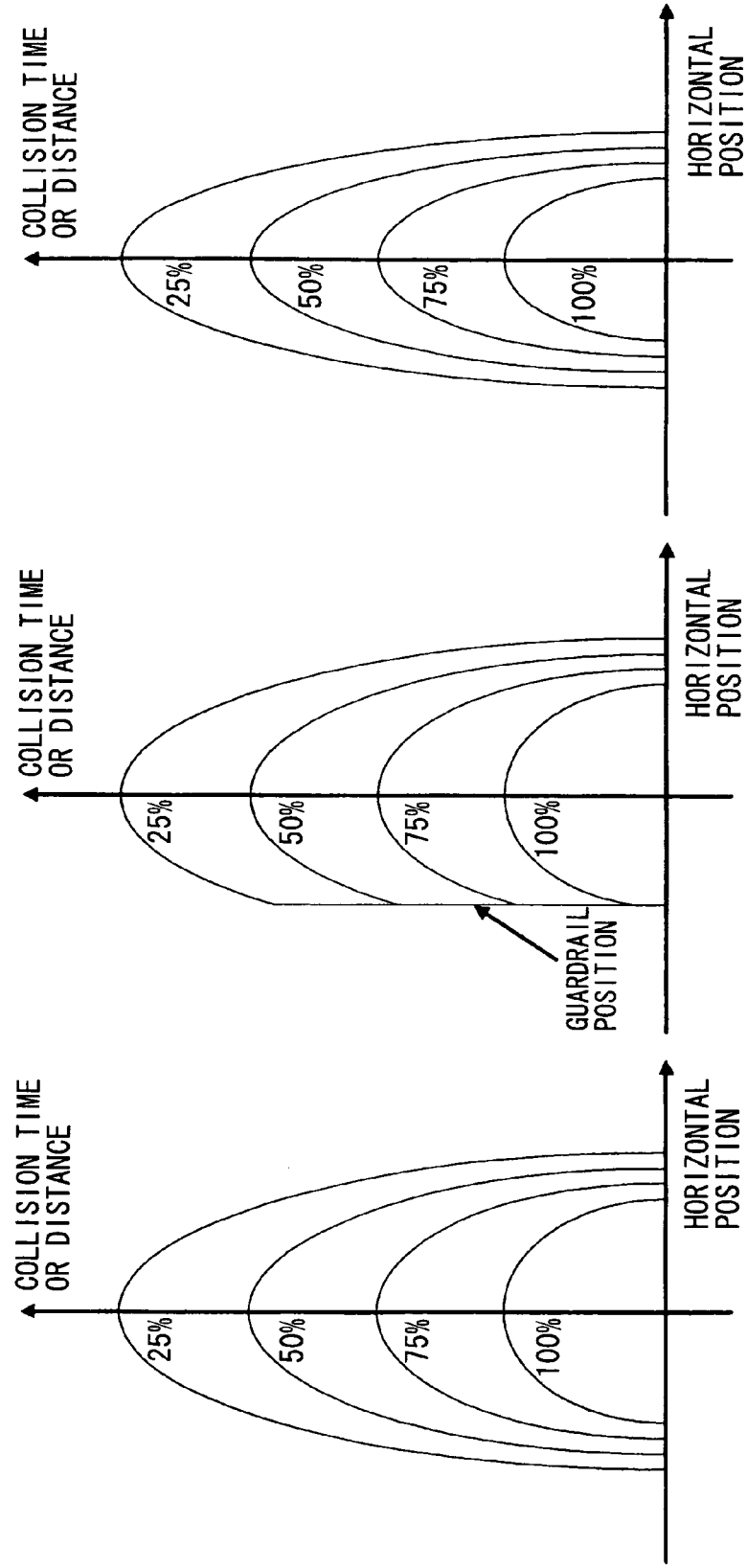

PROXIMITY NOTIFICATION DEVICE, PROXIMITY NOTIFICATION PROGRAM AND METHOD FOR NOTIFYING PROXIMITY OF VEHICLE

CROSS REFERENCE TO RELATED APPLICATIONS

This application is based on and incorporates herein by reference Japanese Patent Application No. 2009-276680 filed on Dec. 4, 2009.

FIELD OF THE INVENTION

The present invention relates to a proximity notification device configured to notify proximity of a self-vehicle to a pedestrian. The present invention further relates to a proximity notification program. The present invention further relates to a method for notifying proximity of a self-vehicle to a pedestrian.

BACKGROUND OF THE INVENTION

For example, Publication of Japanese Patent Application 2005-253236 Reference (JP-A-2005-253236) discloses a proximity notification device configured to determine whether the self-vehicle travels in an area with many pedestrians. The proximity notification device causes a traveling dummy sound when determining that the self-vehicle travels in such an area. It is noted that the proximity notification device possibly fails to cause such a traveling dummy sound even when a pedestrian exists. In such a case, a pedestrian cannot be notified of proximity of the self-vehicle. In addition, the proximity notification device may cause such a traveling dummy sound even when a pedestrian does not exist. In such a case, the self-vehicle causes the traveling dummy sound merely as noise to annoy the driver.

SUMMARY OF THE INVENTION

In view of the foregoing and other problems, it is an object of the present invention to produce a proximity notification device configured to notify a pedestrian of proximity of a self-vehicle so as to provide sufficient alarm to a pedestrian, as needed. It is another object of the present invention to produce a method for notifying proximity of a self-vehicle to a pedestrian.

According to one aspect of the present invention, a proximity notification device for a vehicle to notify proximity of a self-vehicle to a pedestrian, the proximity notification device comprises of a distance acquisition unit configured to obtain a detection result of a position of a pedestrian around the self-vehicle. The proximity notification device further comprises of a probability acquisition unit configured to read a collision probability from a data map with reference to the obtained position of the pedestrian, the collision probability being a probability that a pedestrian collides against the self-vehicle, the data map including positions of a pedestrian beforehand associated with collision probabilities. The proximity notification device further comprises of a function control unit configured to activate an alarm unit to cause an alarm when the read collision probability is higher than a predetermined threshold. The proximity notification device further comprises of an obstacle acquisition unit configured to obtain a detection result of an obstacle, which obstructs movement of a pedestrian. The proximity notification device further comprises of a traveling path estimation unit configured to estimate a traveling path of the self-vehicle on the data map. The probability acquisition unit is further configured to decrease a collision probability in a region of the data map, the region being beyond the detected obstacle when viewed from the traveling path.

According to another aspect of the present invention, a method for notifying proximity of a self-vehicle to a pedestrian, the method comprises of detecting a position of a pedestrian around a self-vehicle. The method further comprises of detecting an obstacle, which obstructs movement of a pedestrian. The method further comprises of estimating a traveling path of the self-vehicle on a data map, which includes positions of a pedestrian beforehand associated with collision probabilities each being a probability that a pedestrian collides against the self-vehicle. The method further comprises of decreasing a collision probability in a region of the data map, the region being beyond the detected obstacle when viewed from the estimated traveling path. The method further comprises of reading a collision probability from the data map with reference to the obtained position of the pedestrian. The method further comprises of activating an alarm unit to cause an alarm when the read collision probability is higher than a predetermined threshold.

BRIEF DESCRIPTION OF THE DRAWINGS

The above and other objects, features and advantages of the present invention will become more apparent from the following detailed description made with reference to the accompanying drawings. In the drawings:

FIGS. 5A to 5C are explanatory views each showing an example of a collision probability data map;

DETAILED DESCRIPTION OF PREFERRED EMBODIMENTS

As follows, embodiments of the present invention will be described with reference to drawings.

<Configuration>

Figure 1:
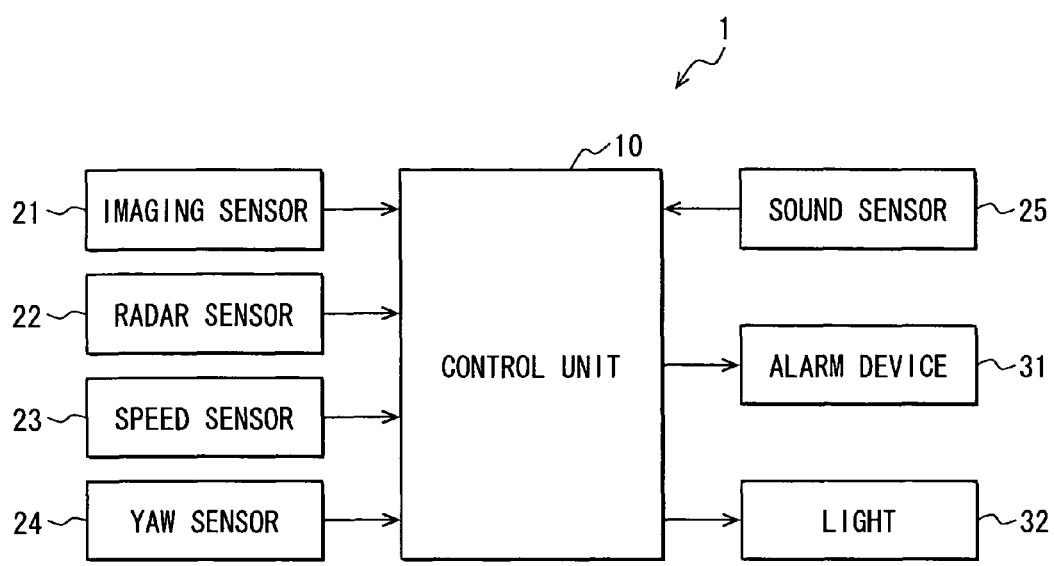
FIG. 1 is a block diagram showing a proximity notification system.

FIG. 1 is a block diagram showing a proximity notification system 1. The proximity notification system 1 is used for a vehicle (self-vehicle) such as a hybrid vehicle or an electric vehicle configured to travel at a low speed without operating an internal combustion engine. The proximity notification system 1 is for notifying an occupant of the vehicle that the vehicle is approaching a pedestrian or another vehicle.

The proximity notification system 1 includes a pedestrian alarm control unit (proximity notification device) 10, an imaging sensor 21, a radar sensor 22, a wheel speed sensor 23, a yaw rate sensor 24, a sound volume sensor 25, an exterior alarm device 31 (alarm unit), and a light 32 (alarm unit).

The imaging sensor 21 obtains an image of a front side of the self-vehicle in the traveling direction and sends image data of the obtained image to the pedestrian alarm control unit 10. The radar sensor 22 emits an electromagnetic wave such as a millimeter wave (millimetric wave) to the front side of the self-vehicle. The radar sensor 22 detects a reflective wave of the emitted electromagnetic wave to detect the distance between the self-vehicle and an object ahead of the self-vehicle. The radar sensor 22 further detects a relative velocity between the self-vehicle and an object ahead of the self-vehicle by utilizing the Doppler Effect.

The wheel speed sensor 23 is a generally-known sensor configured to detect a rotation speed of the wheel of the self-vehicle and the speed of the self-vehicle. The yaw rate sensor 24 is a generally-known sensor configured to detect a yaw rate representing a change in the direction of the self-vehicle.

The sound volume sensor 25 includes a microphone located outside of the self-vehicle and a detection device configured to detect an input level of a sound wave (sound volume) collected by using the microphone. The sound volume sensor 25 transmits information on an input level of a sound wave of a traveling sound (tire noise) caused by the self-vehicle to the pedestrian alarm control unit 10.

The exterior alarm device 31 includes multiple speakers each having directivity, and an amplifier device to drive the speakers. Each of the speakers is directed in a direction different from each other. For example, one of the speakers can emit an alarm in a region of about 15 degrees. The speakers are arranged in the horizontal direction of the self-vehicle and directed in different directions by an angle of 15 degrees. Thereby, the speakers are enabled to emit alarms in a range of 90 degrees or less in the horizontal direction on the front side of the self-vehicle.

The light 32 is, for example, a headlight of the self-vehicle and configured to change the direction of its optic axis horizontally. According to the present embodiment, in particular, the light 32 is configured to illuminate a pedestrian in response to an instruction from the pedestrian alarm control unit 10.

The pedestrian alarm control unit 10 is a generally-known electronic control unit including a CPU, a ROM, a RAM, and the like. The pedestrian alarm control unit 10 is configured to execute a program such as a proximity notification program stored in the ROM or the RAM to determine whether an alarm using the exterior alarm device 31 or the light 32 is required. On determination that an alarm is required, the pedestrian alarm control unit 10 is configured to send an instruction to the exterior alarm device 31 or the light 32 to cause warning. The ROM stores multiple collision probability data maps each representing a relationship between a pedestrian's position and a collision probability of the self-vehicle with a pedestrian.

<Operation>

Figure 2A:
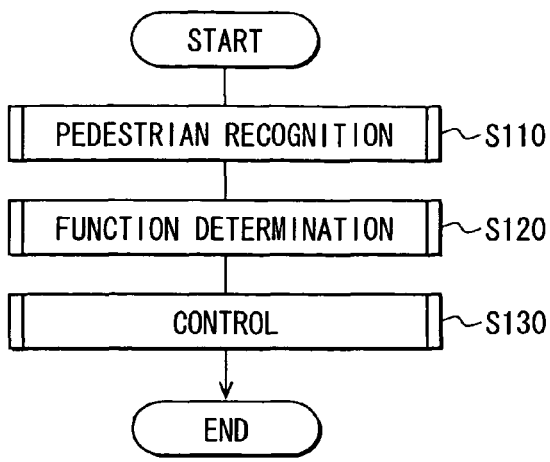
FIG. 2A is a flow chart showing a proximity notification operation.

The proximity notification system 1 performs an operation shown by FIGS. 2A to 8. FIG. 2A is a flow chart showing the proximity notification operation of the pedestrian alarm control unit 10. FIG. 2B is a flow chart showing a pedestrian recognition operation of the proximity notification operation. FIG. 3A is a flow chart showing a complement operation of the pedestrian recognition operation. FIG. 3B is a flow chart showing a collision probability processing of the pedestrian recognition operation.

Figure 6A:
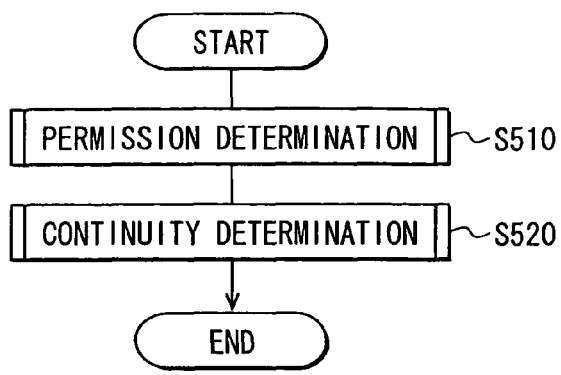
FIG. 6A is a flow chart showing a function determination operation.
Figure 6B:
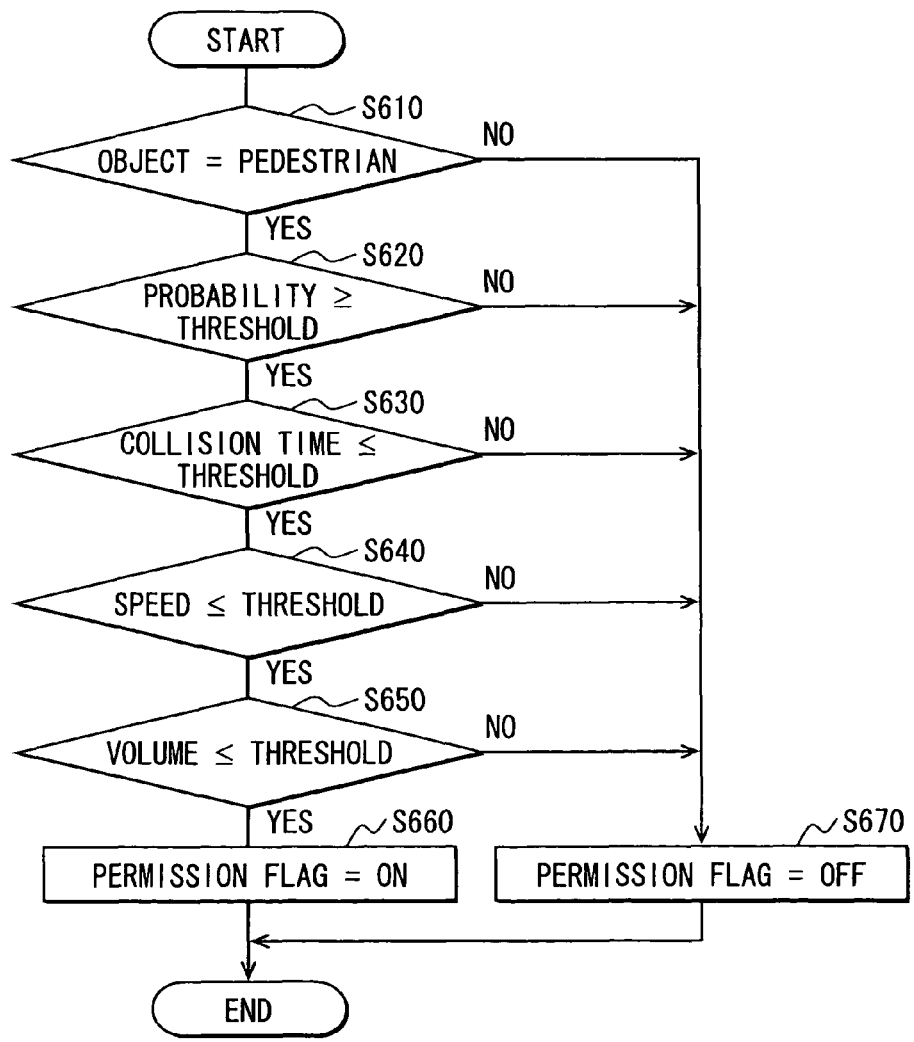
FIG. 6B is a flow chart showing a function permission determination operation.
Figure 7:
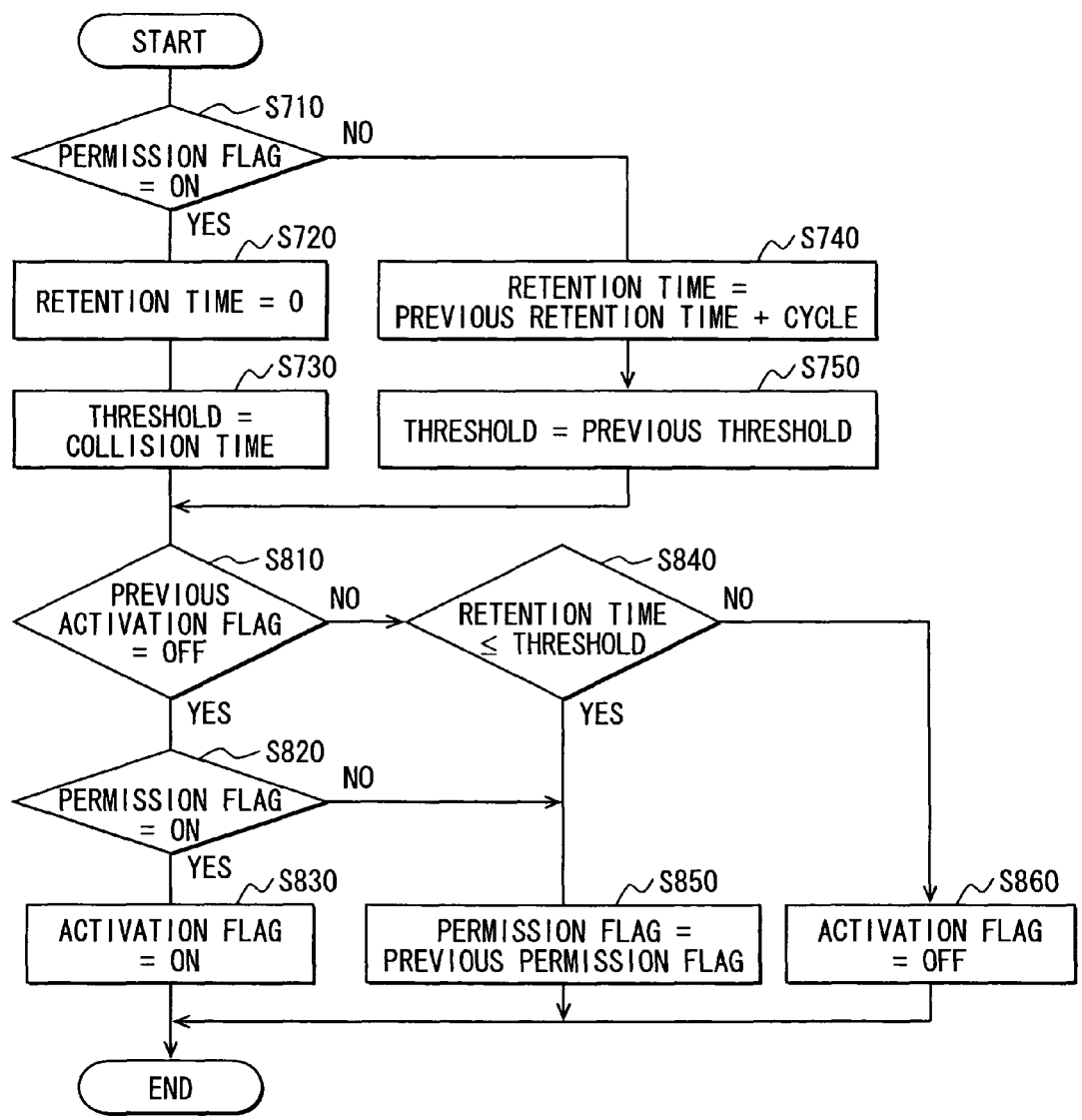
FIG. 7 is a flow chart showing a function continuity determination operation.
Figure 8:
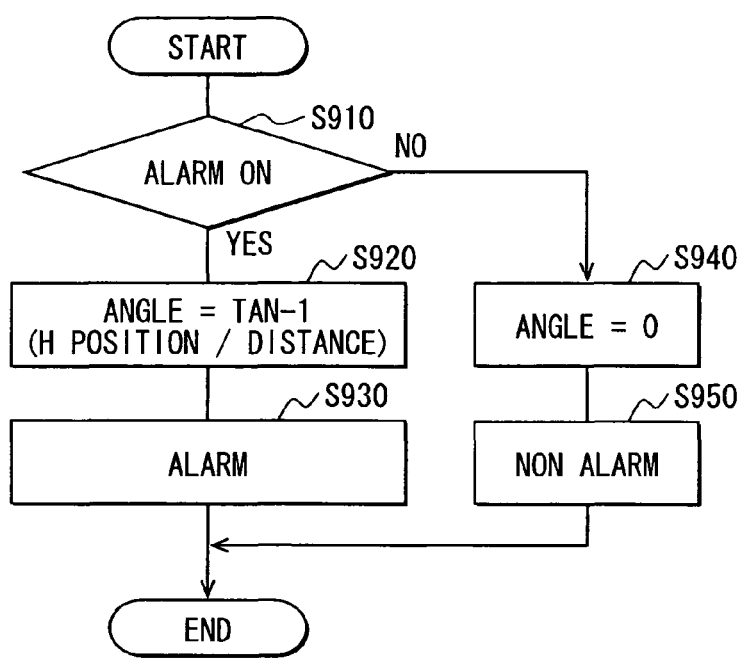
FIG. 8 is a flow chart showing a control operation.

FIG. 6A is a flow chart showing a function determination operation of the proximity notification operation. FIG. 6B is a flow chart showing a function permission determination operation of the function determination operation. FIG. 7 is a flow chart showing a function continuity determination operation of the function determination operation. FIG. 8 is a flow chart showing a control processing of the proximity notification operation. Various flags described later are reset to an OFF state in an initial start of the operation.

The proximity notification operation is started when power supply of the vehicle is activated by, for example, turning an ignition switch device (not shown) ON. Thereafter, the proximity notification operation is repeated at a cycle such as 100 ms. More specifically, as shown in FIG. 2A, the pedestrian recognition operation (S110), the function determination operation (S120: function control unit), and the control operation (S130: function control unit) are performed in order. The proximity notification operation is terminated when the operations end.

Figure 2B:
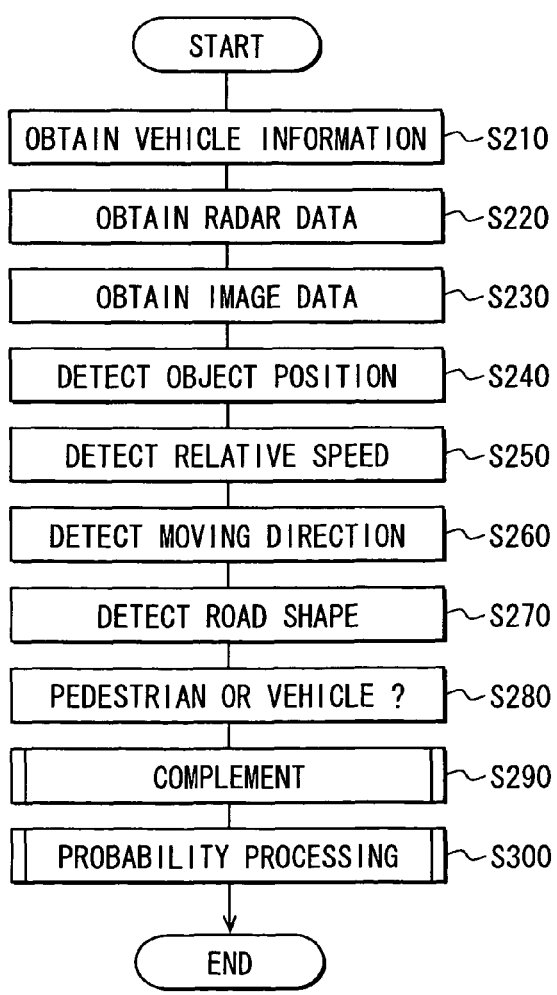
FIG. 2B is a flow chart showing a pedestrian recognition operation.

In the pedestrian recognition operation (S110), as shown in FIG. 2B, information about the self-vehicle is first obtained (S210: noise level acquisition unit, information acquisition unit). More specifically, a detection result of the wheel speed sensor 23, a detection result of the yaw rate sensor 24, and a detection result of the sound volume sensor 25 are obtained.

Subsequently, detection data of the radar sensor 22 is obtained (S220: distance acquisition unit, obstacle acquisition unit), and image data of the imaging sensor 21 is obtained (S230: obstacle acquisition unit). A position of an object such as a pedestrian, a guardrail, and another vehicle is detected based on the data (S240). A relative velocity of the self-vehicle to the object is detected (S250: information acquisition unit), and a moving direction of the object is detected (S260).

The relative velocity is detected based on a detection result of the radar sensor 22. The moving direction of an object is detected through an operation similar to an operation of S330, which will be described later with reference to FIGS. 3A, 4.

Subsequently, a road geometry is detected based on image data (S270: information acquisition unit). In the present operation, the width and the curvature of a road, on which the self-vehicle travels, are detected. In the operation using the image data of the imaging sensor 21, a generally-known edge detection and/or a generally-known white line recognition may be used.

Subsequently, a classification of the object detected through the operation is determined (S280: distance acquisition unit, obstacle acquisition unit). In the present operation, a pattern matching is performed. Specifically, it is determined whether the shape of an object obtained by the radar sensor 22 and the shape of an edge point in image data of an object obtained by the imaging sensor 21 coincide with a predetermined shape. Thereby, the object is identified with pedestrians, such as a pedestrian, a vehicle, a guardrail, a white line, a curbstone, or the like.

When an object is not detected in the operation of S240, the operations of S250, S260, S280 are skipped. Subsequently, a complement operation is performed (S290). In the complement operation, the position of an object (in particular, pedestrian) is estimated when the position of the object moves out of a detection range of the imaging sensor 21 and/or the radar sensor 22.

Figure 3A:
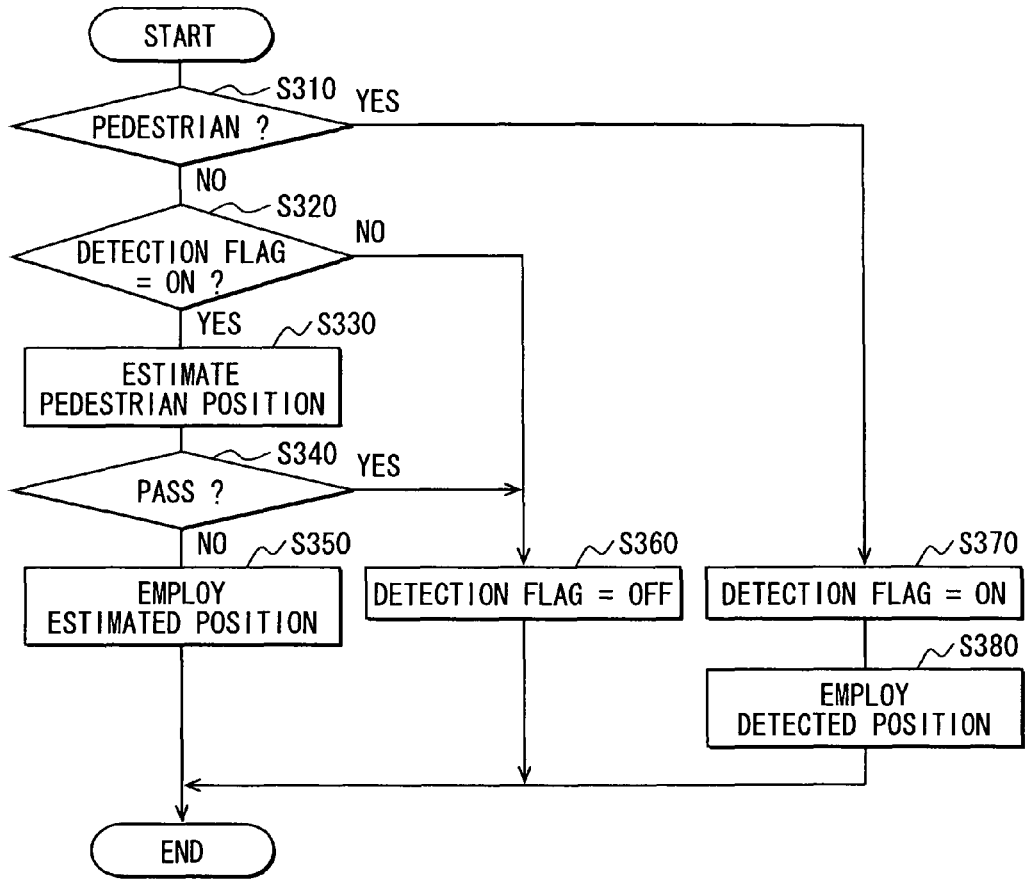
FIG. 3A is a flow chart showing a complement operation.

More specifically, in the complement operation shown in FIG. 3A, it is first determined whether a pedestrian is detected (S310: state change detection unit). When a pedestrian is detected (S310: YES), a detection flag representing detection of a pedestrian is set to an ON state (S370). Further, information (actual measurement position) about the detected pedestrian is set to be employed (S380), and the complement operation is terminated. At least four past actual measurement positions of the pedestrian are stored in a memory device such as the RAM.

When a pedestrian is not detected (S310: NO), it is determined whether the detection flag is in an ON state (S320: state change detection unit). That is, in the operations of S310, S320, a change from a state, where a detection result of the position of a pedestrian around the self-vehicle can be obtained, to a state, where the detection result cannot be obtained, is detected.

Figure 4:
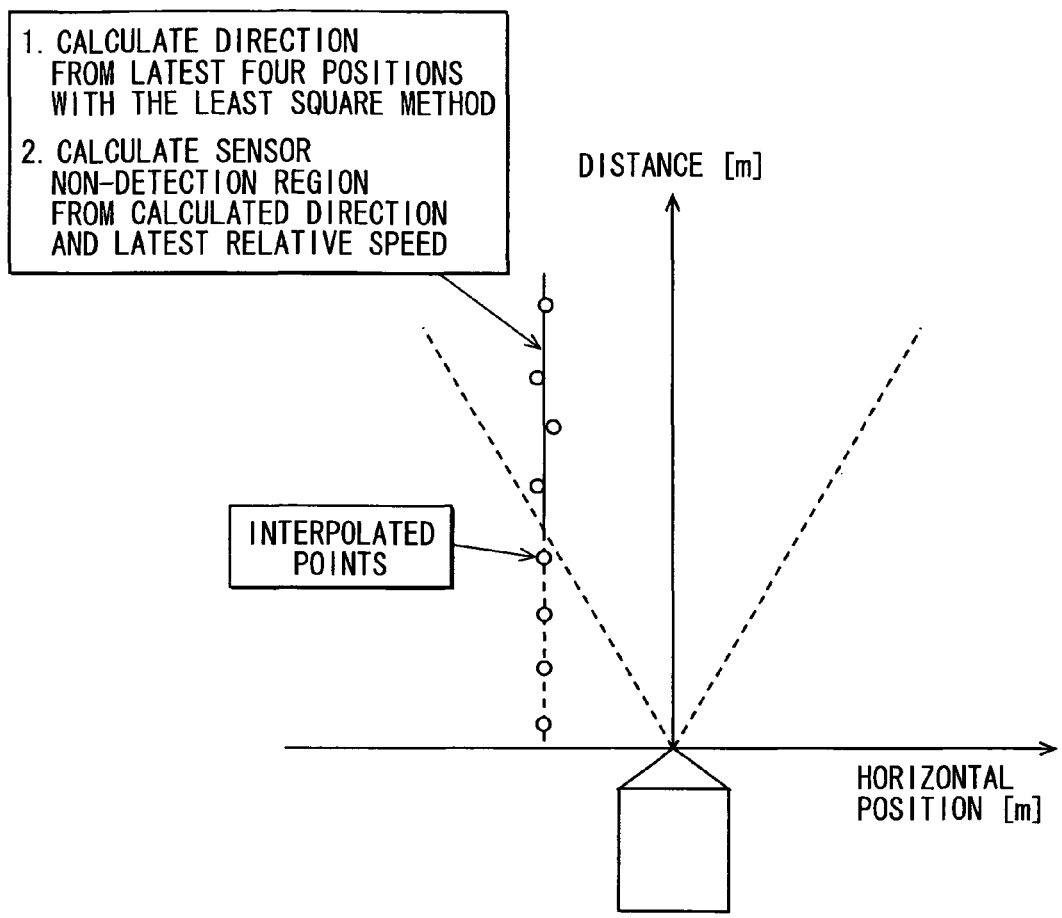
FIG. 4 is a schematic diagram showing an operation to estimate the position of a pedestrian.

When the detection flag is in an ON state (S320: YES), the position of the pedestrian is estimated (S330: estimation unit). The present operation will be described with reference to FIG. 4. FIG. 4 is a schematic diagram showing an operation to estimate the position of a pedestrian.

In FIG. 4, the region on the front side of the two dashed lines is a detection range of the imaging sensor 21 and the radar sensor 22. When the pedestrian's position moves from the inside of the detection range to the outside the detection range, an approximation line is obtained based on the latest four positions of the pedestrian with the least square method so as to detect a relative moving direction of the pedestrian to the self-vehicle. Thus, the pedestrian's present position is estimated based on the pedestrian's latest relative moving speed to the self-vehicle detected by the radar sensor 22 and the detected relative moving direction. The present operation is repeated until the pedestrian passes just the lateral side (immediately side) of the self-vehicle.

Subsequent to S330, it is determined whether the estimated position of the pedestrian is on, the rear side of the lateral side of the self-vehicle (S340: passing determination unit). More specifically, it is determined whether the estimated position of the pedestrian has passed just the lateral side of the frond end portion of the self-vehicle. When the pedestrian's position is on the front side of the lateral side of the self-vehicle, (S340: NO), the estimated pedestrian's position is employed as the present pedestrian's position (S350), and the complement operation is terminated.

In the operation of S350, the estimated pedestrian's position and the relative velocity are stored as the latest information in a memory device such as the RAM. When the detection flag is in an OFF state in the operation of S320 (S320: NO) and when the pedestrian's position is on the rear side of the lateral side of the self-vehicle in the operation of S340 (S340: YES), it is deemed that an alarm is not required for a pedestrian. In this case, the detection flag is maintained at an OFF state (S360), and the complement operation is terminated. In this instance, it is deemed that the estimated pedestrian's position is not employed, and a pedestrian is not detected. Thus, the following operations will be performed.

When the complement operation (S290) is completed, the collision probability processing (S300) is performed. In the collision probability processing, a collision probability is calculated. The collision probability represents a probability that a detected or estimated pedestrian collides against the self-vehicle.

Figure 3B:
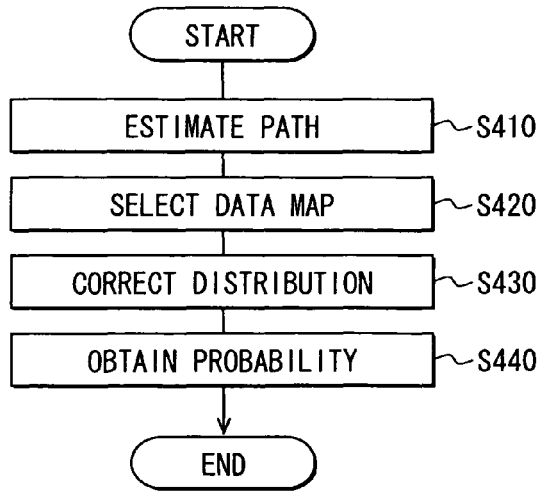
FIG. 3B is a flow chart showing a collision probability processing.

Specifically, as shown in FIG. 3B, a traveling path of the self-vehicle is first estimated (S410: traveling path estimation unit) on multiple collision probability data maps stored in the ROM based on the detection result of the wheel speed sensor 23 and the yaw rate sensor 24.

Subsequently, a collision probability data map is selected (S420). For example, as shown in FIG. 5A to FIG. 5C, the collision probability data maps include a normal data map, a guardrail existing data map, a frontward moving data map, and the like stored in the ROM. The normal data map is employed when the moving speed of the self-vehicle is relatively low. Specifically, for example, the normal data map is employed when the moving speed is less than 30 km/h. The guardrail existing data map (data map when a guardrail exists) is selected when the moving speed of the self-vehicle is relatively low and a guardrail exists on the left side of the self-vehicle. The frontward moving data map (data map when the moving direction is the front direction) is employed when the moving speed of the self-vehicle is relatively high.

In the operation of S420, one of the data maps is selected (employed) according to the moving speed of the self-vehicle and the condition whether a guardrail exists. In the data maps, the center of a front end portion of the self-vehicle is set to the zero point, and the collision probability near the zero point is set to the highest value. As a principle, as the distance increases leftward, rightward, and frontward from the zero point, the collision probability is set to lower values. In each data map, the distance or a collision time may be assigned to the vertical axis.

In the guardrail existing data map, the collision probability in a region of the traveling path of the self-vehicle beyond the guardrail is set to lower values than those of the normal data map. The frontward moving data map is employed when it is estimated that the moving speed of the self-vehicle is relatively high and when it is estimated that the straightness of the movement of the self-vehicle is high. Therefore, compared with the normal data map, the collision probability is set to be quickly lowered as the distance increases leftward and rightward.

Subsequently, the distribution in the selected data map is corrected (S430: probability acquisition unit). For example, when the traveling path goes to the right side, the collision probability in the right region is set to higher values as the distance increases frontward. In addition, the collision probability in the left region is set to lower values as the distance increases frontward. Further, when an obstacle such as a garden plant, another guardrail, or the like exists on the traveling path to inhibit a pedestrian from moving, the collision probability is set to lower values in a region, which is beyond such an obstacle when viewed from the traveling path of the self-vehicle.

Subsequently, the collision probability between the self-vehicle and a pedestrian is obtained (read) by applying the latest pedestrian's position to the corrected data map (S440: probability acquisition unit). Subsequent to the present operation, the collision probability processing is terminated.

Subsequently, in the function determination operation (S120), it is determined whether an alarm is needed in the present instance. In the function determination operation, as shown in FIG. 6A, the function permission determination operation (S510) and the function continuity determination operation (S520: function control unit) are performed in order. When these operations end, the function determination operation is terminated.

As shown in FIG. 6B, in the function permission determination operation, it is first determined whether the kind of an object is a pedestrian (S610). Subsequently, it is determined whether the obtained (read, extracted, sampled) collision probability is more than a threshold such as 50% (S620). Subsequently, it is determined whether a collision time (distance/relative speed) representing a time after which the self-vehicle collides against a pedestrian is less than a threshold such as 5 seconds (S630). Subsequently, it is determined whether the moving speed of the self-vehicle is less than a threshold such as 40 km/h (S640). Subsequently, it is determined whether the sound volume of noise emitted from the self-vehicle less than a threshold such as 50 dB (S650: prohibiting unit). When all the determinations are positive (S610 to S660: YES), an alarm permission flag is set to an ON state to permit an alarm (S660), and the function permission determination operation is terminated.

Alternatively, when at least one of the determinations in negative (one of S610 to S660: NO), the alarm permission flag is set to an OFF state to prohibit an alarm (S670: prohibition unit), and the function permission determination operation is terminated.

In the function continuity determination operation, when an alarm is started, the alarm is continued until the self-vehicle passes by a pedestrian, even when it is determined that an alarm need not be caused at this time. As shown in FIG. 7, in the function continuity determination operation, it is first determined whether the alarm permission flag is set to an ON state (S710).

When the alarm permission flag is set to an ON state (S710: YES), a retention time (timer) is reset to zero (S720). The retention time represents a time after the alarm permission flag changes from an ON state to an OFF state. When the alarm permission flag is in an ON state, the retention time is reset regularly.

Subsequently, a retention time threshold is set to a collision time with a pedestrian (S730). When multiple pedestrians are detected, the retention time threshold is set to the largest one of the collision times corresponding to the pedestrians. Thus, the processing proceeds to 810.

Alternatively, in the operation of S710, when the alarm permission flag is set to an OFF state (S710: NO), a control cycle such as 100 ms is added to the previous retention time to obtain a new retention time (S740). Thus, the previous retention time threshold is set to the new retention time threshold (S750).

Subsequently, the value of the alarm activation flag in the previous control cycle is determined (S810). When the previous alarm activation flag is in an OFF state (S810: YES), it is determined whether the present alarm permission flag is in an ON state (S820). When the present alarm permission flag is in an ON state (S830), the alarm activation flag is set to an ON state (S830), and the function continuity determination operation is terminated. In this way, when the operation of S830 is started, an alarm is caused in the control operation described later.

Alternatively, when the present alarm permission flag is in an OFF state in the operation of S820 (S820: NO), the previous alarm permission flag is maintained (S850). In the case, the alarm permission flag and the alarm activation flag are maintained in an OFF state, and an alarm is not caused. The value of the alarm activation flag is not changed in the operation of S850. Subsequent to the present operation, the function continuity determination operation is terminated.

Subsequently, when the previous alarm activation flag is in an ON state in the operation of S810 (S810: NO), the retention time is compared with the retention time threshold (S840). When the retention time is less than the retention time threshold (S840: YES), the previous alarm permission flag is maintained (S850). In this case, the alarm permission flag is set to an ON state to cause an alarm, irrespective of the value of the present alarm permission flag (result of an immediately preceding function permission determination operation). Subsequent to the present operation, the function continuity determination operation is terminated.

When the retention time is greater than the retention time threshold in the operation of S840 (S840: YES), the alarm activation flag is set to an OFF state (S860), and the operation continuous operation is terminated. In the operation of S860, the alarm permission flag is certainly set to an OFF state.

The control operation (S130) is to actually output an alarm. As shown in FIG. 8, it is first determined whether the alarm activation flag is set to an ON state (S910). When the alarm activation flag is in an ON state (S910: YES), the direction of an alarm is determined (S920).

Specifically, an alarm angle is calculated based on the lateral position of a pedestrian and the distance of the pedestrian.

$$\text{alarm angle} = \tan^{-1}(\text{horizontal position}/\text{distance})$$

Subsequently, the exterior alarm device 31 and the light 32 are operated to emit an alarm in the calculated alarm angle (S930), and the control operation is terminated.

In the operation of S930, the alarm angle and an instruction to emit an alarm sound such as a dummy traveling sound and a chime sound are outputted to the exterior alarm device 31. In addition, the alarm angle and an instruction to activate the light are outputted to the light 32. Thereby, the exterior alarm device 31 selects a speaker configured to output a sound wave in a range of the alarm angle, and causes the selected speaker to output an alarm sound.

The light 32 directs one of the left and right headlights near the pedestrian's position to be in the alarm angle, for example, and cause the headlight to emit light to the pedestrian. Alternatively, when the alarm activation flag is in an OFF state in the operation of S910 (S910: NO), the alarm angle is reset to zero (S940). In this case, the control operation is terminated without outputting an instruction to output an alarm (S950).

<Operation Effect>

In the proximity notification system 1, the pedestrian alarm control unit 10 obtains a detection result of the position of a pedestrian around the self-vehicle. The pedestrian alarm control unit 10 further reads the collision probability corresponding to the obtained position of the pedestrian from the collision probability data map. In the collision probability data map, the position of a pedestrian is beforehand associated with the collision probability, which is a probability that the self-vehicle collides against a pedestrian. The pedestrian alarm control unit 10 activates the exterior alarm device 31 and the light 32 to emit an alarm when the read collision probability is higher than a predetermined threshold.

In short, the proximity notification system 1 of the present embodiment not regularly cause the exterior alarm device 31 and the light 32 to output an alarm but cause the exterior alarm device 31 and the light 32 to output an alarm on detection of a pedestrian when the collision probability between the self-vehicle and the pedestrian is high.

The proximity notification system 1 according to the present embodiment causes an alarm only when the collision probability between the self-vehicle and the pedestrian is high. Therefore, a necessary alarm can be selected, and an unnecessary alarm can be restricted to reduce annoyance. In addition, according to the present embodiment, the collision probability data map is used. Thereby, the collision probability can be finely defined. In addition, an operation for obtaining the collision probability can be simplified compared with calculation of the collision probability using a function.

Furthermore, in the proximity notification system 1, the pedestrian alarm control unit 10 obtains information about traveling of the self-vehicle. The pedestrian alarm control unit further modifies the collision probability data map according to the obtained information. For example, the information about traveling of the self-vehicle includes information on at least one of the geometry (width, curvature, and/or the like) of a road on which the self-vehicle travels, the relative velocity of the self-vehicle to a pedestrian, the traveling speed of the self-vehicle, and the like.

In this case, the proximity notification system 1 can modify the collision probability data map to an optimal data map according to the information about traveling. Thereby, the collision probability can be further finely obtained.

Further, in the proximity notification system 1, the pedestrian alarm control unit 10 obtains a detection result of an obstacle, which prohibits movement of a pedestrian. The pedestrian alarm control unit 10 further estimates the traveling path of the self-vehicle on the collision probability data map. The pedestrian alarm control unit 10 further changes the collision probability to a small value in the collision probability data map in a region, which is beyond the detected obstacle when viewed from the traveling path.

In this case, the proximity notification system 1 can restrict an alarm with respect to a pedestrian being low in a possibility to enter the traveling path of the self-vehicle. Therefore, an unnecessary alarm can be effectively restricted.

Further, in the proximity notification system 1, the pedestrian alarm control unit 10 detects change of a state, in which a detection result of the position of a pedestrian around the self-vehicle can be obtained, to a state, in which the detection result cannot be obtained. The pedestrian alarm control unit 10 further estimates the position of the pedestrian on detection of the change. This operation is performed with reference to the position of the pedestrian in the past, the relative velocity of the self-vehicle to the pedestrian, and the like, for example.

The pedestrian alarm control unit 10 further determines whether the self-vehicle has passed the lateral side of the pedestrian whose position was estimated. The pedestrian alarm control unit 10 further obtains (reads) the collision probability according to the estimated position of the pedestrian after the change to the state, in which the detection result of the position of the pedestrian cannot be obtained, before determining to have passed the lateral side of the pedestrian.

In this case, when the self-vehicle has not passed the lateral side of the pedestrian, the proximity notification system 1 can continue calculation (acquisition) of the collision probability and operation of the exterior alarm device 31 and the light 32 until the self-vehicle passes the lateral side of the pedestrian even in a case where the self-vehicle is out of a detection range of the imaging sensor 21 and the radar sensor 22, which are for detecting the position of the pedestrian. Thus, safety of the self-vehicle can be enhanced.

In the proximity notification system 1, the pedestrian alarm control unit 10 further obtains information on the volume of noise emitted by traveling of the self-vehicle. The pedestrian alarm control unit 10 further prohibits an operation of the exterior alarm device 31 and the light 32 when the volume of noise is greater than a predetermined reference value.

In this case, the proximity notification system 1 deems an alarm to be unnecessary and prohibits an operation of the exterior alarm device 31 and the light 32 when noise from the self-vehicle is louder than the reference value.

In the proximity notification system 1, the exterior alarm device 31 and the light 32 are configured to emit an alarm having directivity to multiple directions. The pedestrian alarm control unit 10 instructs the exterior alarm device 31 and the light 32 to emit an alarm in the direction in which a pedestrian exits.

In this case, the proximity notification system 1 can emit an alarm only in the direction in which a pedestrian exists. Therefore, an alarm can be restricted from being emitted in an unnecessary direction, and consequently annoyance can be reduced.

Other Embodiments

The present invention is not limited to the embodiment described above. Various forms of the present invention can be formulated as long as belonging to the technical scope of the present invention.

For example, in the above embodiment, the sound volume of noise of the self-vehicle is actually detected using the sound volume sensor. It is noted that the speed of the self-vehicle and weather, which relate to a contact condition between the road surface and the tire of the self-vehicle, may be beforehand associated with a sound volume and may be stored in a database. In this case, the sound volume may be set according to a value read from the database based on the speed of the self-vehicle and the weather. These methods may be combined.

In the above embodiment, the imaging sensor 21 and the radar sensor 22 are used for detecting a pedestrian. Alternatively, a sonar device sensor, which is configured to calculate the distance between two cars or objects by using a sound wave, or the like may be provided instead of these sensors.

When the self-vehicle is configured to switch an engine traveling mode and a motor traveling mode, it may be determined whether the self-vehicle is in the motor traveling mode in the function permission determination operation. A manual switch for prohibiting an operation of the exterior alarm device 31 and the like may be provided.

In the above embodiment, an image processing is used for detecting a guardrail. In addition, an image processing may be used for detecting a pedestrian crossing. In this case, a physical relationship between a pedestrian and a pedestrian crossing may be detected. In this case, when a pedestrian is close to a pedestrian crossing, the exterior alarm device 31 and the like may be activated until the self-vehicle passes by the pedestrian crossing, irrespective of a result of the function permission determination operation.

Summarizing the above embodiments, in a proximity notification device, a distance acquisition unit obtains a detection result of a position of a pedestrian around a self-vehicle. The probability acquisition unit obtains the collision probability according to the obtained position of the pedestrian from the collision probability data map in which the position of a pedestrian is beforehand associated with the collision probability, which is a probability that the self-vehicle collides against a pedestrian. The function control unit activates the alarm unit to output an alarm when the obtained collision probability is higher than a predetermined threshold. The obstacle acquisition unit obtains a detection result of an obstacle, which obstructs movement of a pedestrian. The traveling path estimation unit estimates a traveling path of the self-vehicle on the collision probability data map. The probability acquisition unit changes the collision probability to a small value in a region beyond the detected obstacle when viewed from the traveling path in the collision probability data map.

In short, the proximity notification device does not regularly activate the alarm unit but cause an alarm on detection of a pedestrian and only when the collision probability between the self-vehicle and the pedestrian is high. The proximity notification device causes an alarm only when the collision probability between the self-vehicle and the pedestrian is high. Therefore, a necessary alarm can be extracted, and an unnecessary alarm can be restricted to reduce annoyance. In addition, the collision probability data map is used. Thereby, the collision probability can be finely defined. In addition, an operation for obtaining the collision probability can be simplified compared with calculation of the collision probability using a function.

A distribution of the collision probability in the collision probability data map is deemed to be experimentally determined. Generally, the collision probability is high near the self-vehicle. Specifically, the collision probability is high on a path on which the self-vehicle will travel and in a region near the path. The collision probability is set to be lower as being distant from the path and the region.

The proximity notification device can restrict an alarm with respect to a pedestrian being low in a possibility to enter the traveling path of the self-vehicle. Therefore, an unnecessary alarm can be effectively restricted.

In the proximity notification device, an information acquisition unit may obtain information about traveling of the self-vehicle. The information about traveling of the self-vehicle may include at least one of information such as the geometry (width, curvature) of a road on which the self-vehicle travels, the relative velocity of the self-vehicle to a pedestrian, the traveling speed of the self-vehicle, and the like. The probability acquisition unit may change the collision probability data map to be referred according to the obtained information.

Specifically, the change of the collision probability data map may be performed in the following ways. For example, multiple collision probability data maps may be formulated beforehand. In this case, one collision probability data map to be referred may be selected from the multiple collision probability data maps according to whether the value of the obtained information is greater than a predetermined threshold (curvature and speed of a reference road). Alternatively, one collision probability data map may be beforehand prepared. In this case, distribution of the relationship between the position of a pedestrian and the collision probability may be changed according to the value of the obtained information. These methods may be combined.

When the distribution of the relationship between the position of a pedestrian and the collision probability is changed, for example, in a case where the road geometry curves rightward, the collision probability on the right side may be set higher than the collision probability on the left side as being distant from the self-vehicle. Further, as the speed of the self-vehicle and the relative speed in a proximity direction becomes high, the collision probability may be set high at a position distant from the self-vehicle in the traveling direction of the self-vehicle. In addition, as the speed of the self-vehicle and the relative speed in the proximity direction becomes high, the collision probability may be set low in a region on the right side and the left side away from the traveling direction of the self-vehicle.

In this case, the proximity notification device can modify the collision probability data map to an optimal data map according to the information about traveling. Thereby, the collision probability can be further finely obtained.

The proximity notification device may further include a state change detection unit for detecting change from a state, in which the distance acquisition unit can obtain a detection result of the position of a pedestrian around the self-vehicle, to a state, in which the distance acquisition unit cannot obtain the detection result of the position of the pedestrian around the self-vehicle. The proximity notification device may further include an estimation unit for estimating the position of the pedestrian when the state change detection unit detects change from the state, in which the detection result of the position of the pedestrian can be obtained, to the state, in which the detection result of the position of the pedestrian cannot be obtained. The proximity notification device may further include a passing determination unit for determining whether the self-vehicle has passed the lateral side of the pedestrian (just beside the pedestrian) whose position was estimated by the estimation unit. The probability acquisition unit may obtain the collision probability according to the position of the pedestrian estimated by the estimation unit in a period after change to the state, in which the detection result of the position of the pedestrian is not obtained, until the passing determination unit determines that the self-vehicle has passed.

In particular, when the estimation unit estimates the position of the pedestrian, a storage device such as a memory device may store the position of the pedestrian in the past and the relative velocity to the pedestrian, and the present position of the pedestrian may be estimated according to the stored information.

In this case, when the self-vehicle has not passed the lateral side of the pedestrian, the proximity notification device can continue calculation (acquisition) of the collision probability and operation of the alarm unit until the self-vehicle passes the lateral side of the pedestrian even in a case where the self-vehicle is out of a detection range of the position detecting unit, which are for detecting the position of the pedestrian. Thus, safety of the self-vehicle can be enhanced.

The proximity notification device may further include a noise level acquisition unit for obtaining information on the volume of noise caused by traveling of the self-vehicle. The proximity notification device may further include a prohibition unit for prohibiting an operation of the alarm unit when the volume of noise is greater than a predetermined reference value.

In this case, the proximity notification device deems an alarm to be unnecessary and prohibits an operation of the alarm unit when noise caused by the self-vehicle is louder than the reference value. The volume of noise of the self-vehicle may be actually be detected using a sound volume sensor and may be predetermined correspondingly to the speed or the weather. These detection and use of predetermined volume may be combined together.

In the proximity notification device, the function control unit, may instruct an alarm unit, which has directivity and configured to cause an alarm in multiple directions, to cause an alarm in the direction in which a pedestrian exists.

In this case, the proximity notification device can cause an alarm only in the direction in which a pedestrian exists. Therefore, causing an alarm in an unnecessary direction can be restricted, and consequently annoyance can be reduced. A proximity notification program is for causing a computer to function as each unit of the proximity notification device when executed.

The program can produce an effect similarly to that of the proximity notification device.

The above structures of the embodiments can be combined as appropriate. The above processings such as calculations and determinations are not limited being executed by the pedestrian alarm control unit 10. The control unit may have various structures including the pedestrian alarm control unit 10 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A proximity notification device for a vehicle to notify proximity of a self-vehicle to a pedestrian, the proximity notification device comprising:
   a distance acquisition unit configured to obtain a detection result of a position of a pedestrian around the self-vehicle;
   a probability acquisition unit configured to read a collision probability from a data map with reference to the obtained position of the pedestrian, the collision probability being a probability that a pedestrian collides against the self-vehicle, the data map including positions of a pedestrian beforehand associated with collision probabilities;
   a function control unit configured to activate an alarm unit to cause an alarm when the read collision probability is higher than a predetermined threshold;
   an obstacle acquisition unit configured to obtain a detection result of an obstacle, which obstructs movement of a pedestrian; and
   a traveling path estimation unit configured to estimate a traveling path of the self-vehicle on the data map, wherein
   the probability acquisition unit is further configured to decrease a collision probability in a region of the data map, the region being beyond the detected obstacle when viewed from the traveling path.

2. The proximity notification device according to claim 1, further comprising:
   an information acquisition unit configured to obtain information about traveling of a self-vehicle, wherein
   the probability acquisition unit is further configured to modify the data map according to the obtained information.

3. The proximity notification device according to claim 1, further comprising:
   a state change detection unit configured to detect change from a first state to a second state,
      wherein in the first state, the distance acquisition unit can obtain a detection result of a position of a pedestrian around the self-vehicle,
      wherein in the second state, the distance acquisition unit cannot obtain the detection result;
   an estimation unit configured to, when the state change detection unit detects change from the first state to the second state, estimate the position of the pedestrian; and
   a passing determination unit configured to determine whether the self-vehicle passes a lateral side of the pedestrian whose position is estimated by the estimation unit, wherein
   the probability acquisition unit is further configured to read the collision probability from the data map with reference to the position of the pedestrian estimated by the estimation unit in a period after change to the second state until the passing determination unit determines that the self-vehicle passes the lateral side of the pedestrian.

4. The proximity notification device according to claim 1, further comprising:
   a noise level acquisition unit configured to obtain information on a volume of noise caused by traveling of the self-vehicle; and
   a prohibition unit configured to prohibit an operation of the alarm unit when the volume of noise is greater than a predetermined reference value.

5. The proximity notification device according to claim 1, wherein the function control unit is further configured to instruct an alarm unit to cause an alarm in a direction in which a pedestrian exists, the alarm unit being configured to cause an alarm having directivity in a plurality of directions.

6. A proximity notification program product configured to cause a computer to function as each of the units of the proximity notification device according to claim 1 when being executed by the computer.

7. A method for notifying proximity of a self-vehicle to a pedestrian, the method comprising:
   detecting a position of a pedestrian around a self-vehicle;
   detecting an obstacle, which obstructs movement of a pedestrian;
   estimating a traveling path of the self-vehicle on a data map, which includes positions of a pedestrian beforehand associated with collision probabilities each being a probability that a pedestrian collides against the self-vehicle;
   decreasing a collision probability in a region of the data map, the region being beyond the detected obstacle when viewed from the estimated traveling path;
   reading a collision probability from the data map with reference to the obtained position of the pedestrian; and
   activating an alarm unit to cause an alarm when the read collision probability is higher than a predetermined threshold.

8. A computer readable medium comprising instructions executed by a computer, the instructions including the method according to claim 7.

* * * * *